(12) United States Patent
Kersey et al.

(10) Patent No.: US 6,898,338 B2
(45) Date of Patent: May 24, 2005

(54) FABRY-PEROT SENSING ELEMENT BASED ON A LARGE-DIAMETER OPTICAL WAVEGUIDE

(75) Inventors: Alan D. Kersey, South Glastonbury, CT (US); Martin A. Putnam, Cheshire, CT (US); Mark R. Fernald, Enfield, CT (US); Robert N. Brucato, Cheshire, CT (US); James S. Sirkis, Wallingford, CT (US)

(73) Assignee: Weatherford/Lamb, Inc., Houston, TX (US)

( * ) Notice: Subject to any disclaimer, the term of this patent is extended or adjusted under 35 U.S.C. 154(b) by 101 days.

(21) Appl. No.: 10/151,475

(22) Filed: May 17, 2002

(65) Prior Publication Data

US 2002/0196995 A1 Dec. 26, 2002

Related U.S. Application Data

(60) Provisional application No. 60/298,927, filed on Jun. 18, 2001.

(51) Int. Cl.$^7$ ................................................ G02B 6/00
(52) U.S. Cl. .............................. 385/13; 385/12; 385/15
(58) Field of Search .............................. 385/12–15, 37, 385/50

(56) References Cited

U.S. PATENT DOCUMENTS

| | | | |
|---|---|---|---|
| 699,940 A | 5/1902 | Yarrington et al. ............. 2/313 |
| 707,084 A | 8/1902 | Carman ........................ 353/65 |
| 714,332 A | 11/1902 | Rudolph ..................... 138/136 |
| 751,589 A | 2/1904 | Westinghouse ............. 415/187 |
| 5,007,705 A | 4/1991 | Morey et al. ................. 385/12 |
| 5,392,117 A | 2/1995 | Belleville et al. ........... 356/352 |
| 5,469,250 A | 11/1995 | Holmes ........................ 356/20 |
| 6,056,436 A | 5/2000 | Sirkis et al. ................ 374/161 |
| 6,115,401 A | 9/2000 | Scobey et al. ............. 372/100 |
| 6,137,812 A | 10/2000 | Hsu et al. ...................... 372/6 |
| 6,181,729 B1 | 1/2001 | O'Farrell ..................... 375/130 |
| 6,229,827 B1 | 5/2001 | Fernald et al. ................ 372/20 |
| 6,310,990 B1 | 10/2001 | Putnam et al. ................ 385/12 |
| 6,363,089 B1 | 3/2002 | Fernald et al. ................ 372/20 |
| 6,580,512 B1 * | 6/2003 | Hussey et al. ............. 356/480 |
| 2002/0159671 A1 * | 10/2002 | Boyd et al. ................... 385/12 |

FOREIGN PATENT DOCUMENTS

| | | | |
|---|---|---|---|
| WO | WO 00/37914 | 6/2000 | .................. 372/20 |
| WO | WO 00/37969 | 6/2000 | .................. 372/20 |
| WO | WO 00/39617 | 7/2000 | .................. 372/20 |

OTHER PUBLICATIONS

U.S. patent application Ser. No. 09/455,868, Putnam et al., filed Dec. 6, 1999.

(Continued)

*Primary Examiner*—Akm Enayet Ullah
*Assistant Examiner*—Kevin S. Wood
(74) *Attorney, Agent, or Firm*—Moser, Patterson & Sheridan, L.L.P.

(57) ABSTRACT

An optical sensing device including a force-applying assembly for providing a force and a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an output optical signal containing information about a parameter that relates to the force. Sometimes the large-diameter waveguide is formed by collapsing a glass tube, having a bore and having an outer diameter of about one millimeter, onto a pair of optical fibers arranged in tandem in the bore and separated by a predetermined distance, and respective end faces of the optical fibers form the cavity and are coated with a wholly or partially reflective material.

14 Claims, 16 Drawing Sheets

OTHER PUBLICATIONS

U.S. patent application Ser. No. 09/519,220, Bailey et al., filed Mar. 6, 2000.

U.S. patent application Ser. No. 10/173,972, Kersey et al., filed Jun. 17, 2002.

U.S. patent application Ser. No. 09/707,084, Fernald et al., filed Nov. 6, 2000.

U.S. patent application Ser. No. 09/699,940, Sullivan et al., filed Oct. 30, 2000.

U.S. patent application Ser. No. 09/751,589, Kersey et al., filed Dec. 29, 2000.

U.S. patent application Ser. No. 09/752,332, Engel et al., filed Dec. 29, 2000.

* cited by examiner

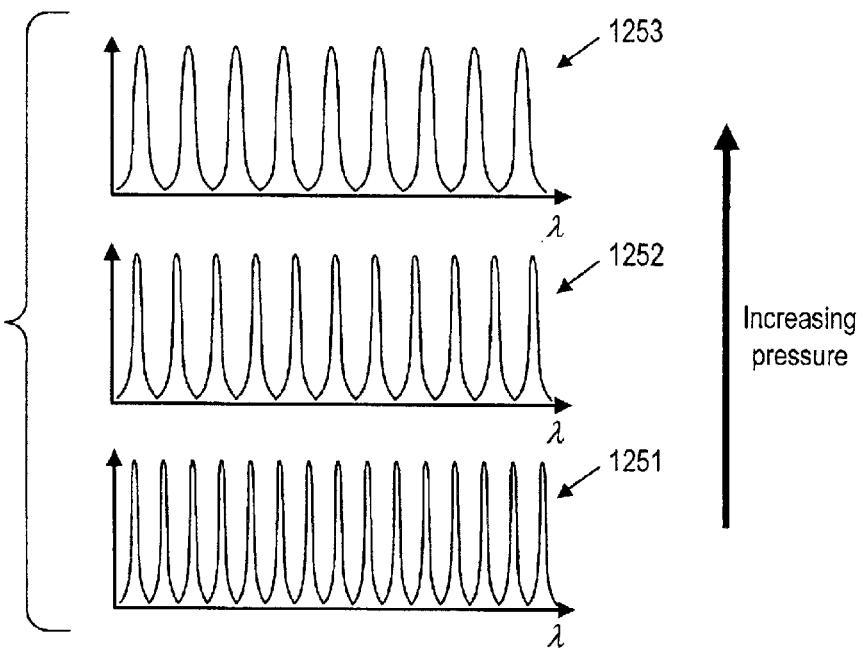

FABRY-PEROT SENSING ELEMENT BASED ON A LARGE-DIAMETER OPTICAL WAVEGUIDE

This application claims the benefit of Provisional Application No. 60/298,927, filed Jun. 18, 2001.

BACKGROUND OF INVENTION

1. Technical Field

The present invention relates to an optical device that is an optical sensor for sensing a parameter such as strain or temperature; and more particularly to a Fabry-Perot sensor having optical fibers embedded into an all-glass structure, the glass structure in some applications having strain amplification properties.

2. Description of Related Art

Fiber Fabry-Perot (FFP) sensors have been used extensively in the field of fiber optic sensing. The FFP sensor has a particular advantage of being very simple to construct, particularly using a format known as the Extrinsic Fabry-Perot Interferometer (EFPI). Such a device is formed by taking two fiber ends and inserting them into an alignment tube with an inner diameter slightly larger than that of the outer diameter of the fibers. The fibers are set in the tube so as to have a predetermined gap between their end faces. Such glass-collapsing technology is shown and described, for example, in U.S. patent application Ser. No. 09/455,867, filed Dec. 6,1999, as well as U.S. patent application Ser. No. 09/455,865, filed Dec. 6,1999. A device so formed can be used as a Fabry-Perot sensor, which can be interrogated along either fiber lead. With uncoated fiber ends, the so-called finess of the FFP is very low (nominally 2), but can be increased by coating the fiber end faces with suitable coatings. To use an EFPI as a pressure sensor element, an arrangement is provided by which the optical path difference (OPD) between the two end faces depends on the pressure being sensed, for example through a mechanical coupling of one fiber to a pressure responsive diaphragm.

In providing an FP-element-based sensor, it is advantageous to embed an FP element (i.e. an FFP etalon with a cavity having a variable optical path length) in a structure that will respond suitably to pressure. It is known in the art to collapse a glass tube onto two fibers. For example, such glass collapsing technology is shown and described in U.S. patent application Ser. No. 09/455,867, entitled *Bragg Grating Pressure Sensor*, filed Dec. 6,1999, as well as U.S. patent application Ser. No. 09/455,865, entitled *Tube-encased Fiber Grating*, filed Dec. 6, 1999, both hereby incorporated by reference in their entirety. It is also known to use the resulting glass element from the glass collapsing technology as a transducer. The glass collapsing technique produces high stability grating-based sensors that provide high repeatability and low hysteresis.

What is needed is an FP element making use of structures provided by the aforementioned glass collapsing technique, FP elements that can be used as sensors.

SUMMARY OF THE INVENTION

Accordingly, the present invention provides an optical device including: a force-applying assembly for providing a force; and a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an optical signal containing information about a parameter that relates to the force.

In a further aspect of the invention, the large-diameter waveguide has a diameter of about 1 millimeter or greater.

In another further aspect of the invention, the large-diameter waveguide is formed by collapsing a glass tube, having a bore therein and having an outer diameter of about 1 millimeter or greater, onto a pair of optical fibers arranged in tandem in the bore and separated by a predetermined distance. In some applications according to this aspect of the invention, respective end faces of the optical fibers form the cavity and are sometimes coated with a wholly or partially reflective material.

In a still further aspect of the invention, the large-diameter waveguide structure has Bragg gratings respectively therein in relation to the end faces.

In still another further aspect of the invention, the optical signal contains sensed information about a physical parameter such as pressure or temperature.

In a yet still another further aspect of the invention, the optical signal contains information about an optical parameter such as an optical phase or wavelength.

In still yet even another further aspect of the invention, the optical device is a sensor having a glass envelope coupled to the large-diameter waveguide that responds to the parameter such as pressure or temperature.

In yet still even another further aspect of the invention, the optical device includes as part or all of the cavity an air gap and the optical device comprises a material arranged in the air gap that has an optical characteristic that changes depending on the parameter.

In still even another further aspect of the invention, the large-diameter waveguide has a slot therein that forms the cavity.

In yet still even another further aspect of the invention, the slot has a Bragg grating formed therein along the length of the large-diameter waveguide.

In still even another further aspect of the invention, the large-diameter waveguide includes a pair of fiber Bragg gratings arranged on opposite sides of the slot so as to provide the reflective surfaces of the cavity.

In yet still even another further aspect of the invention, the large-diameter waveguide has a slit substantially perpendicular to the axis of the large-diameter waveguide that forms the FP cavity.

In still even another further aspect of the invention, the large-diameter waveguide has a slit substantially parallel to its axis and forms the cavity therein.

From another perspective, the invention is a multiplexed Fabry-Perot (FP) sensor system having a plurality of FP sensors, each FP sensor having a cavity and including: a large-diameter waveguide having end faces separated by a predetermined but variable distance, the end faces delimiting all or part of the cavity of the FP sensor; wherein the cavity is responsive to an optical signal, and further responsive to a force applied to the large-diameter waveguide that causes a change in the optical path length of the cavity, and provides in turn an optical signal containing information about a parameter that relates to the force applied to the large-diameter waveguide.

The foregoing and other features and advantages of the present invention will become more apparent in light of the following detailed description of exemplary embodiments thereof, as illustrated in the accompanying drawing.

BRIEF DESCRIPTION OF THE DRAWINGS

The drawings include numerous Figures, and the following is a brief description thereof.

FIG. 5 includes three graphs showing for a FP element used as a pressure sensor, the change in spectral output with increasing pressure.

DETAILED DESCRIPTION OF THE INVENTION

The invention is an arrangement of optical elements including a Fabry-Perot (FP) etalon built into the core of a large-diameter waveguide, the large-diameter waveguide in turn, in some embodiments, included in a structure or formed into a structure specially designed to amplify strain experienced by the FP etalon. The arrangement of the FP etalon and large-diameter waveguide, and in some embodiments a pressure-responsive gel/oil provided in an air gap serving as part or all of the etalon cavity, is here called simply an FP element.

Various embodiments are disclosed. The embodiments can be categorized as arrangements in which either the FP cavity length is changed by the external influence, or the optical path length of the cavity is changed because for example the cavity is filled with a fluid (the pressure-responsive gel/oil mentioned above) and the fluid index of refraction is changed by the external influence (again though, because the cavity length changes due to the external influence, compressing, more or less, the fluid in the cavity).

Figure 1:
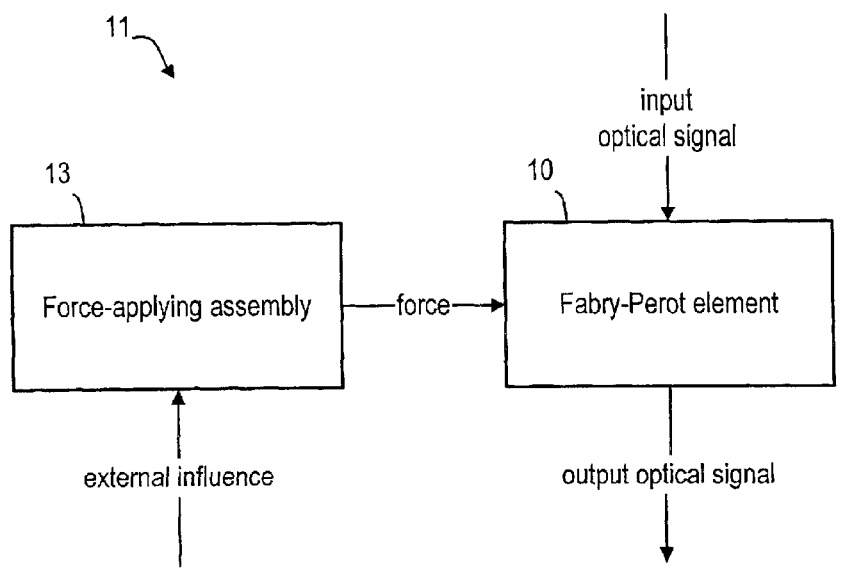
FIG. 1 is a schematic/block diagram of the invention, showing a Fabry-Perot (FP) element modified by a force associated with an external influence, providing an optical signal derived from an input optical signal in a way correlated to the force.

FIG. 1 shows a Fabry-Perot (FP) optical device generally indicated as 11 including a force-applying assembly 13 and an FP element 10. The FP optical element processes an (input) optical signal according to the force provided by the force-applying assembly to produce an output optical signal. In operation, the force-applying assembly responds to an environmental, such as ambient pressure. An environmental influence as used herein is referred to as external influence. Thus, in response to an external influence, the force-applying assembly applies a force to the FP element, and the FP element processes an optical signal in a way that depends on the force so that either the force that was applied can be determined (in a sensor application.

Figure 2:
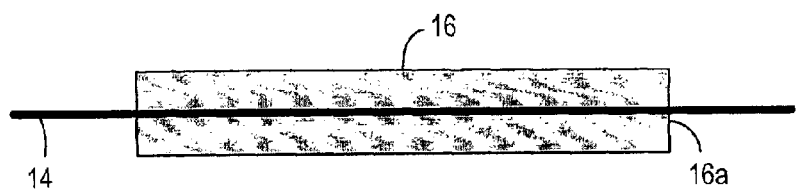
FIG. 2 is a schematic of an optical fiber fused into the bore of a large-diameter tube, according to the prior art.

FIG. 2 shows an optical fiber embedded in, or fused into a bore in, a large-diameter waveguide, according to one or another glass-collapsing process known in the prior art, such as for example, by collapsing a first glass tube having a diameter of 1 millimeter or greater onto two sections of optical fiber forming a first collapsed tube, then collapsing a second glass tube having a diameter of 3 millimeters or greater onto the first collapsed millimeter tube. As discussed above, a suitable glass-collapsing process or technology is shown and described in U.S. patent application Ser. Nos. 09/455,867 and 09/465,865, both filed on Dec. 6, 1999, and both hereby incorporated by reference in their entirety. See also U.S. patent application Ser. No. 09/455,808, filed Dec. 6, 1999, and U.S. patent application Ser. No. 09/456,112, filed Dec. 6, 1999, for a description of what is there called a cane structure, which is a name sometimes used to refer to a large-diameter waveguide made according to a particular process, both also hereby incorporated by reference in their entirety. The present invention uses an optical fiber embedded in, or fused into a bore in, a large-diameter waveguide as the basis for an FP element. The scope of the invention is not intended to be limited to any particular glass-collapsing technology.

Figure 3A:
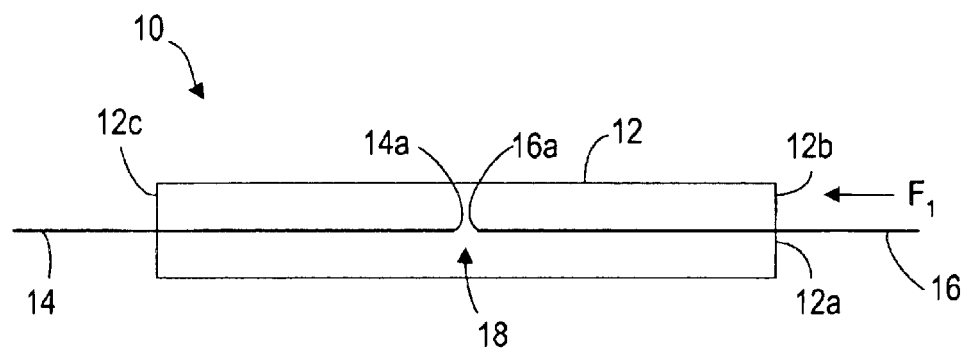
FIG. 3A is a schematic of an FP element according to the invention, in which a fiber FP element is fused into the bore of a glass tube.

FIG. 3A shows a new and unique FP element generally indicated as 10 having a glass tube 12 including a bore generally indicated as 12a and a pair of optical fibers 14, 16 embedded inside the bore 12a of the glass tube 12. As shown, the optical fibers 14, 16 can be fused inside the bore 12a of the glass tube 12 by any one or more processes, such as are discussed above in connection with FIG. 2, and the scope of the invention is not intended to be limited to the manner in which the optical fibers 14, 16 are embedded inside the bore 12a of the glass tube 12.

The pair of optical fibers 14, 16 have respective end faces 14a, 16a forming an air gap serving as part or all of the FP cavity, the air gap being generally indicated as 18 and having a length typically in the range of from approximately 100 to approximately 500 micrometers. Ends 12b, 12c of the glass tube 12 respond to a force F1 applied thereto, for changing the distance D of the air gap between the respective end faces 14a, 16a of the pair of optical fibers 14, 16. Either optical fiber 14, 16 responds to an optical signal, for providing an output optical signal containing information about the change in the distance D of the air gap 18 between the respective end faces 14a, 16a of the pair of optical fibers 14, 16. In effect, the output optical signal has fringes with different frequencies in the optical frequency domain. An increase in the force F1 applied to the ends 12b, 12c of the glass tube 12 causes a decrease in the distance D of the air gap 18 between the respective end faces 14a, 16a of the pair of optical fibers 14, 16 and a decrease in the frequency of spectral modulation, i.e. a decrease in the spacing between the peaks of the output of the FP element, the output optical signal. Embodiments are envisioned in which the glass tube 12 is arranged in a piezoelectric or magnetostrictive transducer-like device.

The respective end faces 14a, 16a can be cleaved perpendicular to the axis of the pair of optical fibers 14, 16, as shown. They substantially abut one another, and have mirrored surfaces, either coated (FIG. 8) or uncoated (FIG. 3A). A coating is preferably either gold, titanium oxide or silicon nitride, and enhances reflectivity thereby producing a higher finesse FP cavity, which results in sharper resonance peaks and thus better wavelength resolution. Typically during manufacturing, the gold for a coating is vaporized during glass welding and redeposited on the respective end faces after cooling. Oxide layers which may survive the high temperature collapse process include the titanium oxide or silicon nitride coatings that may be applied to the fiber ends to produce higher reflectivities of the partial reflectors.

It is also noted that the loss between the two optical fibers 14, 16 can be a serious limitation. Expansion of the core of the two optical fibers 14, 16 so as to lower losses would allow better pass-through designs.

Figure 3B:
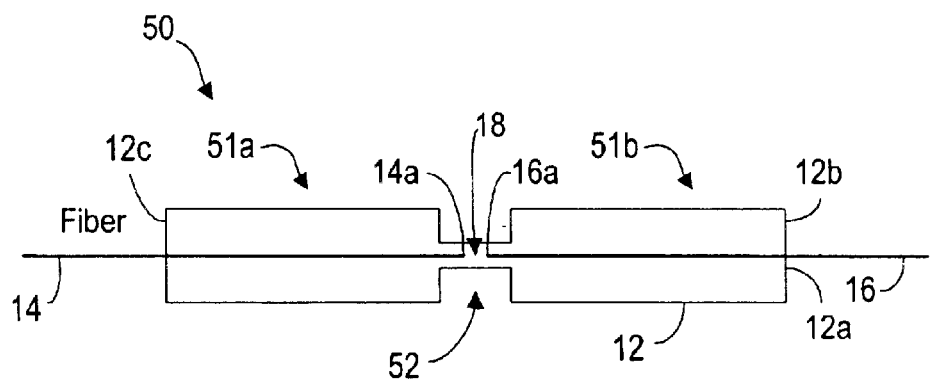
FIG. 3B is a schematic of an FP element as shown in FIG. 3A, except that the glass tube is provided with a thinned-down region, resulting in a so-called dogbone structure having strain amplification properties.

FIG. 3B shows an FP element generally indicated as 50, including a glass tube 12 having a dogbone structure consisting of two piston portions 51a, 51b and a thinned-down region 52 therebetween surrounding an air gap 18. In operation, the ends of the glass tube respond to a force F1 applied, and two piston portions 51a, 51b amplify (or concentrate) the force F1 so as to be more effective in changing the distance D of the air gap between the respective end faces of the pair of optical fibers. (Instead of the force being distributed over the relatively large area of the dogbone ears, it is distributed over the relatively small area of the center column or thinned-down region 52.)

Figure 4A:
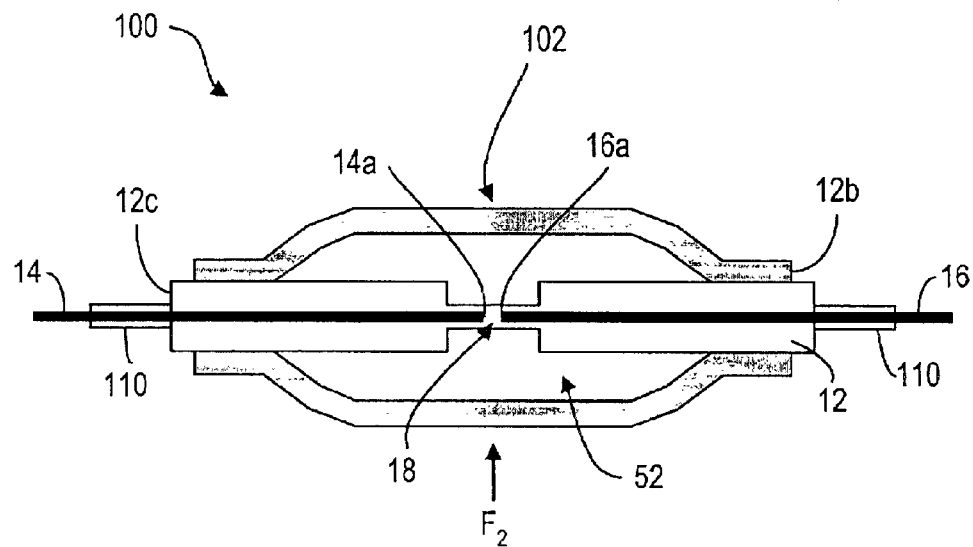
FIG. 4A is a schematic of an embodiment of an FP element having a glass tube with a thinned-down region and a glass envelope encapsulating the same.

FIG. 4A shows an FP element generally indicated as 100, having a glass envelope 102 encapsulating a glass tube 12 with a thinned-down region 52 where an air gap 18 is provided between gap end faces 14a, 16a of a pair of optical fibers 14, 16. In operation, the glass envelope 102 responds to a force F2 by bending inward, toward the thinned-down region, with the result that the air gap 18 changes in length.

FIG. 4A also shows a glass tube 110 extending from the distal ends 12b, 12c (relative to the air gap 18) of the glass tube 12. The glass tube 110 has a diameter of 1 millimeter or greater that provides strain relief between the optical fiber 16 and the glass tube 12. The glass tube 110 is a vestige of the method used to fabricate these devices. The fabrication process involves first collapsing the optical fiber 16 inside the glass tube 110. The glass tube 110 is then collapsed inside a second glass tube 12 having a diameter of 3 millimeters or greater and a slightly shorter length. The glass tube 110 extending from the glass tube 12 in FIG. 4A represents a remaining portion of the 1 millimeter tube from this manufacturing process.

Figure 4B:
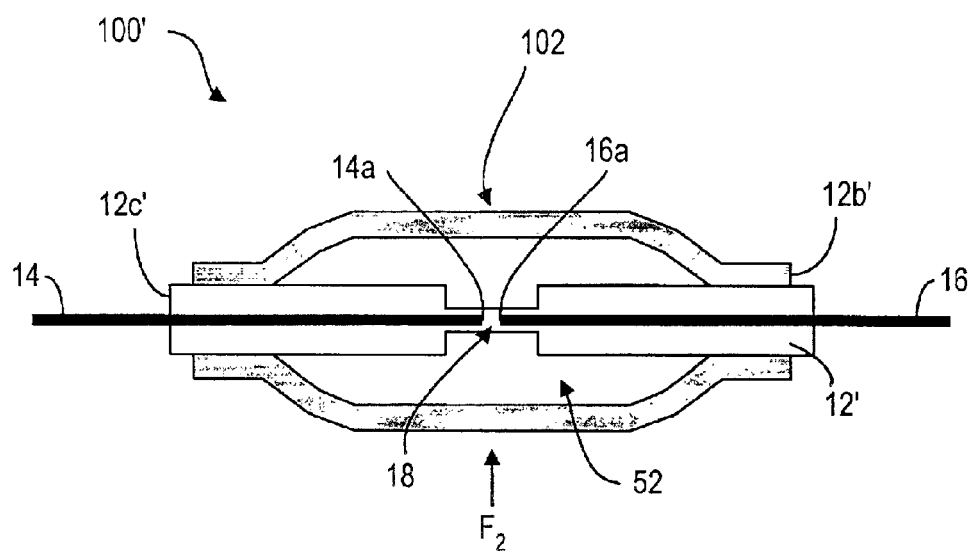
FIG. 4B is a schematic of another embodiment of an FP element having a glass tube with a thinned-down region and a glass envelope encapsulating the same.

FIG. 4B shows an alternative embodiment of an FP element, generally indicated as 100', including a glass tube 12' that is a single large-diameter waveguide (also known as a cane structure), but is otherwise the same as the embodiment of FIG. 4A, and so has a pair of optical fibers 14, 16 arranged in the single large-diameter waveguide. As does the embodiment shown in FIG. 4A, the single large-diameter tube 12' has ends 12b', 12c' to which a glass envelope 102 is affixed, and responds to a force F2 by bending inward, toward the thinned-down region, with the result that the air gap 18 changes in length.

When using an FP element according to the invention in a sensor application, a broadband source of light is used as the (input) optical signal (see FIG. 1). Referring now to FIG. 5, with such an (input) optical signal, the return signal (i.e. the output signal) is a "channeled" spectrum; i.e. a wavelength-modulated spectral reflection, such as is shown in the figure any of the graphs 1251 1252 1253 of wavelength versus intensity. The modulation evident in the output optical signal represents the interference fringes in the wavelength (or optical frequency) domain. As indicated above, in a sensor application, the FP element 10 (FIG. 1) is made to experience a force associated with the physical characteristic being sensed, via the force-applying assembly 13. In a pressure sensor application based on the embodiments of FIG. 4A or 4B, the FP element 100 or 200, under the action of the glass envelope 102 (which plays the role of the force-applying assembly of FIG. 1), experiences compressive loading as a result of (ambient) pressure, and as the pressure increases, the air gap 18 decreases (it being perhaps counterintuitive that in a hydrostatic pressure environment, the glass envelope does not bend inward and the gap indeed closes as pressure increases), and the separation increases between adjacent peaks of the output optical signal (i.e. the number of "fringes" over a given spectral range decreases). The spectral characteristics of the output uniquely define the air gap 18 of the FP element 10 100 200, and thus through a calibration procedure, the pressure can be determined. The calibration procedure examines the position of each peak in the wavelength range of interest and uses the information to solve for the change in the air gap serving as the cavity of the FP element.

It should be understood that it is the cavity length of the FP element that determines the characteristics of the output optical signal, and in the embodiments indicated in FIGS. 4A and 4B, the air gap is the cavity. However, in other embodiments, as indicated below, there might not be an air gap (the air gap may be filled with a pressure-responsive oil/gel). In other embodiments, as also indicated below, there are anti-reflective coatings on one or both of the gap end faces 14a, 16a, and a Bragg grating is set back into one or another of the optical waveguides. The air gap 18 then serves as only part of the cavity of the FP element, and may even be located outside of the FP element (as shown in FIG. 19B).

It is noted that for a subtle change in pressure, a change sufficient to produce a net change in the cavity length that is less than the resonant wavelength, the shift in the wavelength "fringes" appears as a phase shift. For example, for a cavity length change of $\lambda/4$, the fringes shift by about 180 degrees. It is only for large enough pressure changes that the change in the overall wavelength (or frequency) of the fringes can be monitored, i.e. the frequency of the fringes changes within the frequency range of interest due to a change in pressure.

Figure 6:
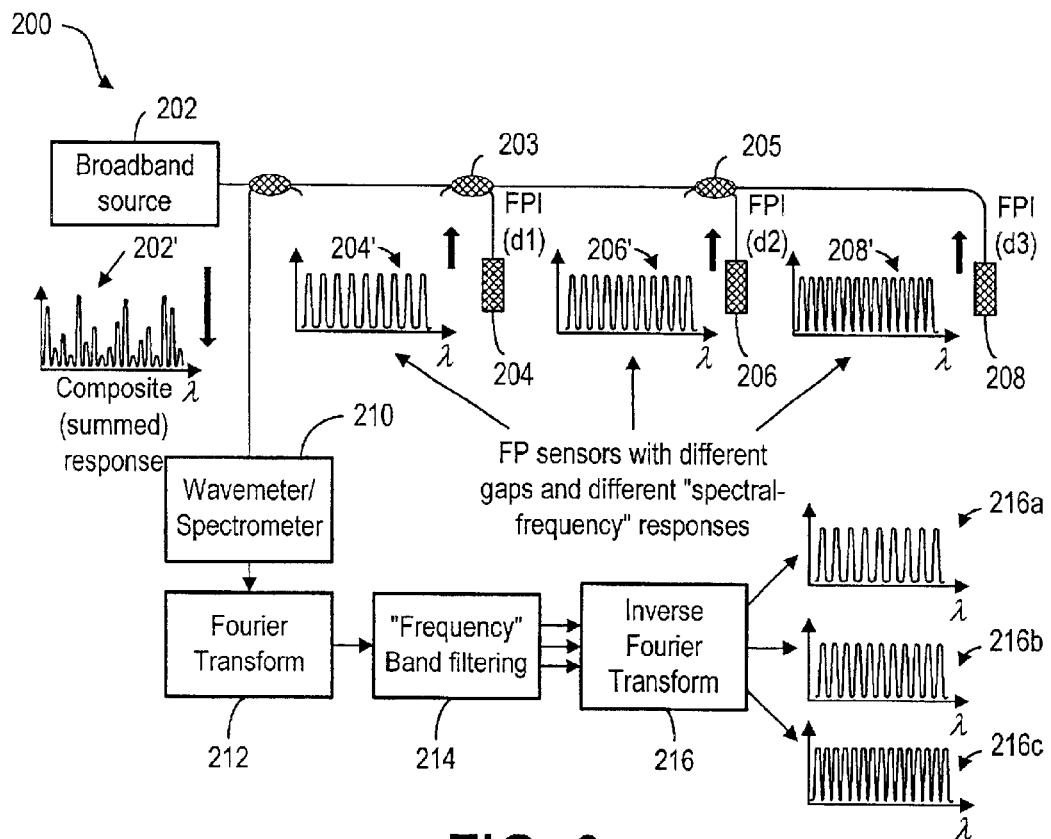
FIG. 6 is a block diagram of a multiplexed array of FP elements used as pressure sensors, according to the invention.

FIG. 6 shows a multiplexed FP sensor system, generally indicated as 200, in which any FP elements according to the invention can be used as an FP sensor 204 206 208. The FP sensor system includes a broadband source 202, a coupler 203, an array of FP sensors 204, 206, 208, a coupler 205, a wavemeter/spectrometer 210, a Fourier transform module 212, a frequency band filter 214 and an inverse Fourier transform module 216.

In general, such multiplexing is accomplished using "spectral frequency" division addressing. Sensors configured with different cavity lengths d1, d2, d3 produce fringes at different frequencies in the optical frequency domain, as shown in the graphs 204' 206' 208' of the respective optical signals (outputs) provided by the different sensors. With the arrangement shown in FIG. 6, the spectral outputs of the sensors 204, 206, 208 add incoherently (powers sum, not amplitudes), producing a complex spectral pattern 202'. The spectral frequencies associated with each of the sensors can, however, be separated using a form of frequency band separation, such as by taking a Fourier transform of the total received spectral signal, separating the resulting peaks into different channels, and performing an inverse Fourier transform on each, yielding separated spectral outputs (fringes) 216a 216b 216c, one for each sensor.

In operation, the broadband source 202 provides a broadband optical signal. Each FP sensor 204, 206, 208 responds to the broadband optical signal, for providing a respective output optical signal containing information about the change in the respective different distance D of a respective Air gap between respective end faces of a pair of optical fibers of the FP sensors 204, 206, 208. Respective output optical signals are coupled via the couplers 203, 305 to the wavemeter/spectrometer 210 in the form of the composite response signal shown in FIG. 4D.

The wavemeter/spectrometer 210 responds to the composite response signal, providing a wavemeter/spectrometer signal containing information about the spectrum of the composite response signal. The Fourier transform 212 responds to the wavemeter/spectrometer signal, providing a Fourier transform signal containing information about the Fourier transform of the wavemeter/spectrometer signal. The frequency band filter 214 responds to the Fourier transform signal, providing a frequency band filter signal containing information about the filtering of the Fourier transform signal. The inverse Fourier transform 216 responds to the frequency band filter signal, providing an inverse Fourier transform signal containing information about the respective different spectral frequency responses from the different FP sensors.

Figure 7:
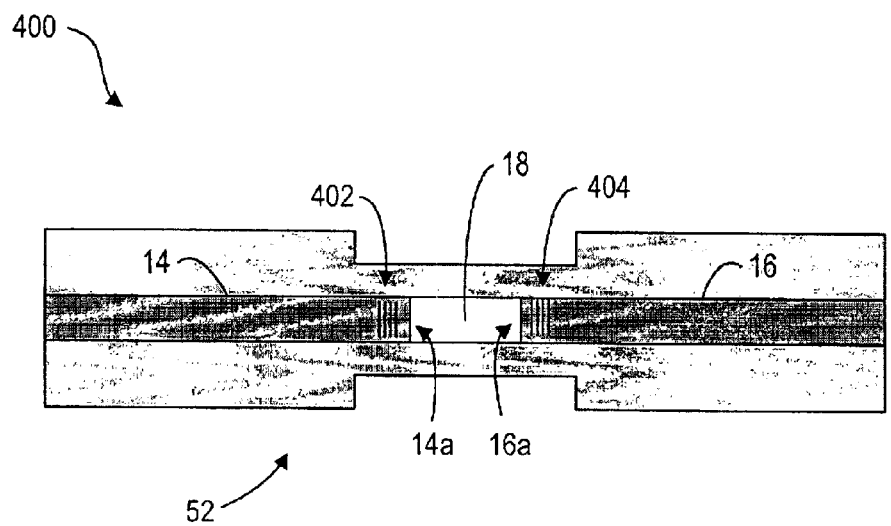
FIG. 7 is a schematic of an alternative embodiment of an FP element, one in which the FP element includes a Bragg grating.

FIG. 7 shows an alternative embodiment of an FP element generally indicated as 400, one similar to the above-described embodiments, including optical fibers 14 16 arranged inside a dogbone structure 52 so as to have an air gap 18 delimited by end faces 14a 16a of the core material of the optical fibers 14 16. Instead of using for the cavity boundaries the end faces 14a 16a of the optical fibers 14 16 defining the air gap, it includes two Bragg gratings 402 404 slightly set back into the optical fibers 14 16, one on either side of the air gap. The Bragg gratings 402, 404 are broadband gratings written into the last few 100 um or so of the optical fibers 14, 16; they provide a degree of wavelength selectivity for each sensor, allowing wavelength multiplexing in addition to the spectral-frequency domain multiplexing discussed above.

An FP element such as shown in FIG. 7 may be used as a component of a pressure sensor. In addition, because the Bragg gratings reflect light according to the spacing between the elements of the gratings (i.e. between the regions of high index of refraction), and because the inter-element spacing depends on the temperature of the Bragg grating (since the thermal coefficient of expansion of glass is non-negligible), the embodiment of FIG. 7 may also be used for monitoring the temperature of the FP element 400, or additional Bragg gratings (not shown) may be written in the optical fibers 14,16 for doing the same.

Figure 8:
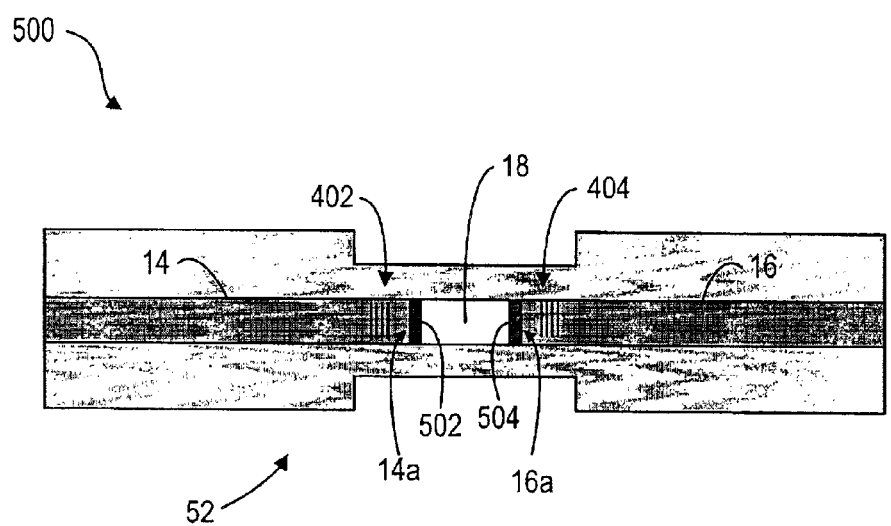
FIG. 8 is a schematic showing another alternative embodiment of an FP element, one in which the FP element includes optical fibers with surface coatings on their end faces.

FIG. 8 shows an embodiment of an FP element, generally indicated as 500, similar to the embodiment of FIG. 7, but one in which the end faces 14a, 16a (serving as the walls of the air gap 18) are coated with a surface coating 502, 504 that may include gold, titanium oxide, or silicon nitride, to enhance reflectivity thereby producing a higher finesse FP cavity, which results in sharper resonance peaks and thus better wavelength resolution, as discussed above.

When using a large diameter fiber or a fully collapsed fiber as the basis for an FP element, as in the present invention, one can etch or machine away a slit in the fiber either perpendicular (FIGS. 9A and 9B) to the fiber (i.e. so that material is removed along the length of the fiber, at about the thickness of the core and down to and including the core, but not extending appreciably past the core) or parallel (FIGS. 10A and 10B) to the fiber (i.e. so that material is removed along some length of the fiber but this time across the entire width of the fiber down to and including the core, but not extending appreciably past the core). Inside ends of the core are polished and can be coated to obtain desired transmission and reflective properties. This etching or machining can be done to provide various FP gaps. The large diameter fiber or a fully collapsed fiber is then machined to a dogbone structure, if desired.

Figure 9A:
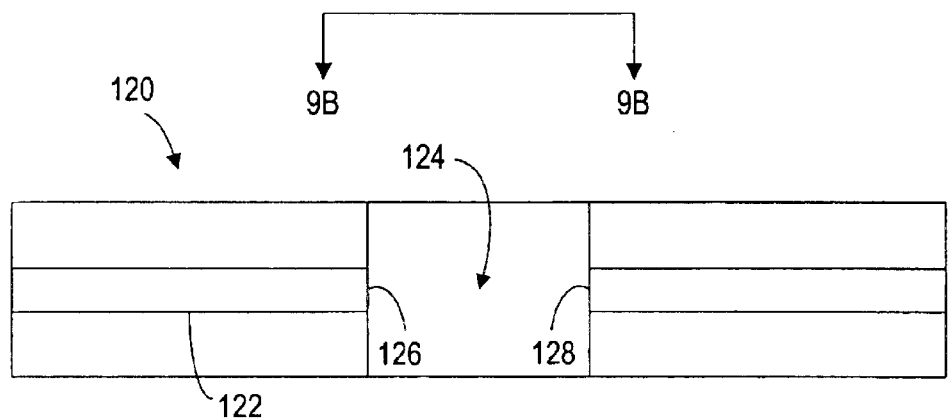
FIG. 9A is a top view of a glass tube with a core and having a perpendicular slit therein (down to just past the core) serving as all or part of the cavity of an FP element according to the invention.
Figure 9B:
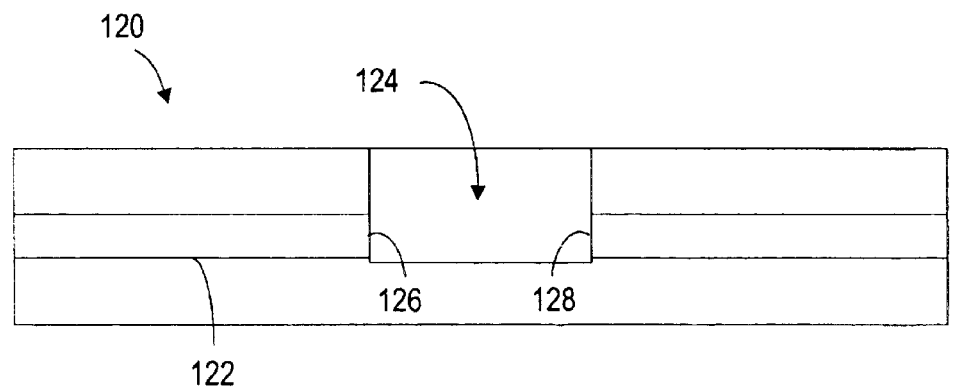
FIG. 9B is a side view of the glass tube shown in FIG. 9A.

For example, FIGS. 9A and 9B show a glass tube 120 having a perpendicular slit to form an etched area or air gap 124 serving as part or all of the cavity of an FP element. Even though the glass tube of FIGS. 9A and 9B is cylindrical, FIG. 9A might be called a plan view or top view, and FIG. 9B might be called a side view or elevation view. The etching is performed so as to remove material only down just past the core 122, leaving behind an approximately hemispheric portion of material connecting the two sides of the glass tube on either side of the etched area or air gap 124. As shown, the glass tube 120 has an optical fiber core 122 on each side of the etched area or air gap 124. The optical fiber core 122 has gold coated faces 126, 128. The perpendicular slit cuts all the way across the optical fiber core 122.

Figure 10A:
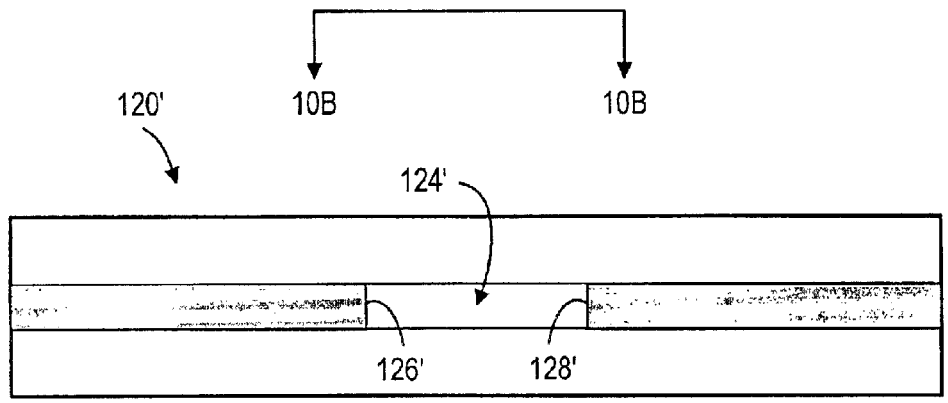
FIG. 10A is a top view of a glass tube with a core and having a parallel slit therein (so that material is removed only for a width about equal to the diameter of the core and down to just past the core) serving as all or part of the cavity of an FP element according to the invention.
Figure 10B:
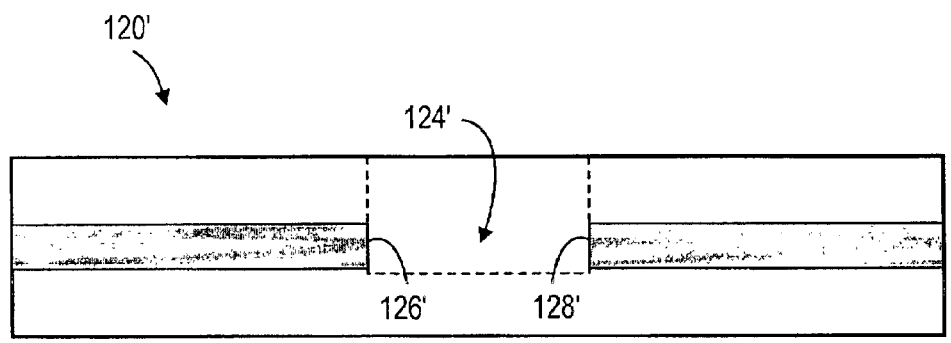
FIG. 10B is a side view of the glass tube shown in FIG. 10A.

Alternatively, FIGS. 10A and 10B shows a glass tube 120' having a parallel slit forming an etched area or air gap 124' serving as a FP cavity. The glass tube 120' has an optical fiber core 122' on each side of the etched area or air gap 124'. As in the perpendicular cut shown in FIGS. 9A and 9B, the etching is performed so as to remove material only down just past the core 122, but in contrast with the perpendicular cut shown in FIGS. 9A and 9B, the parallel cut can be visualized as a quite narrow cut along the length of the fiber, a cut that need only be slightly wider than the core, leaving behind almost the entire cylinder of glass tube 120'. The optical fiber core 122' has gold coated faces 126', 128'. The parallel slit cuts across the optical fiber core 122'.

Figure 11:
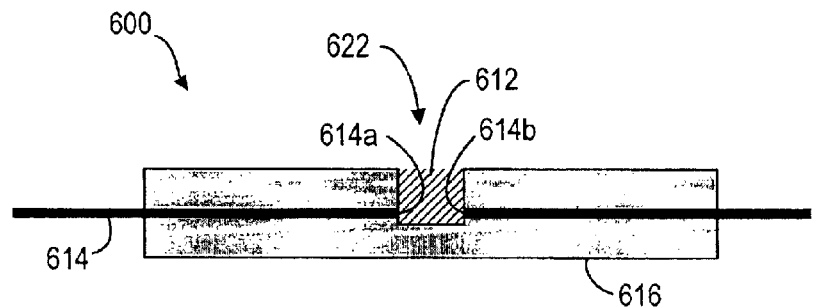
FIG. 11 is a schematic of an FP element, having an air gap serving as part or all of the cavity, where a pressure responsive gel/oil is used to fill the air gap and so cause the optical path length of the cavity to vary (even if the physical length of the air gap does not) in response to an external influence creating a change in the pressure of the gel/oil.

FIG. 11 shows an FP element 600 that includes a glass tube 616 holding an optical fiber 614 with an air gap or slot 622 filled with a pressure-responsive material 612, such as a gel or an oil. The glass tube 616 has a bore with the optical fiber 614 fused therein.

The FP element 600 is initially formed by collapsing the glass tube 616 around a section of fiber 614. As discussed above, such a glass collapsing process or technology is shown and described in patent application Ser. No. 09/455,867, as well as patent application Ser. No. 09/455,865. The scope of the invention is not intended to be limited to any particular glass collapsing technology.

FIG. 11 shows the glass tube 616 after it is ground down to produce an opening or a slot 622 along the length of the glass tube 616 to a depth that passes through at least the core of the optical fiber 614. The configuration then forms an EFPI, with an air gap between two faces 614a, 614b of the optical fiber 614 of a length equal to the length of the slot 622.

An FP element such as shown in FIG. 11 is normally very stable, due to the relatively good mechanical stability of the glass tube 616. Nevertheless, filling the slot 622 with a material 612 of a suitable index of refraction (i.e. an index that depends on some parameter such as temperature or pressure) provides a variable optical path length of the cavity of the EFPI (the optical path length being the index times the physical length of the cavity). Certain oils, for example, have an index that is quite sensitive to changes in pressure because of a corresponding change in density of the oils; some oils can exhibit a change in density of as much as or more than 50% when the pressure changes from 1 bar to 100 bars.

The FP element 600 may also be formed from a single large-diameter waveguide (also known as a fiber cane), as discussed above.

Figure 12:
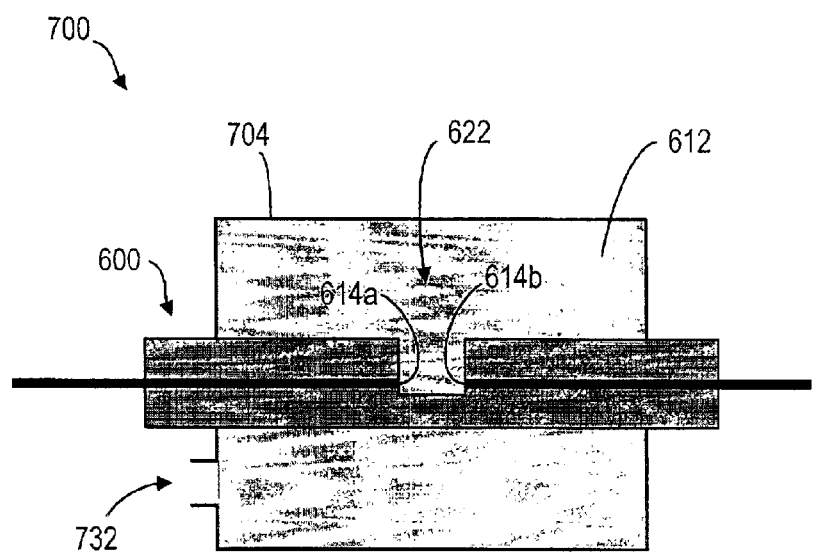
FIG. 12 is a schematic of an FP element including a pressure housing filled with pressure responsive gel/oil.

FIG. 12 shows an FP element 600, such as described in connection with FIG. 11, enclosed in a pressure housing 704 filled with a pressure responsive gel/oil 612 and having a pressure port 732, the overall arrangement generally indicated as a device 700 and obviously of use as a pressure sensor. In an embodiment of the pressure sensor with the arrangement shown, the housing 704 plays the role of the force-applying assembly 13 (FIG. 1). In the pressure sensor shown in the figure, the FP element 600 is immersed in the volume of gel/oil 612 and is pressure-coupled to the external pressure field of interest via the pressure port 732. Since uncoated fiber ends would be weak reflectors if near index-matched by the gel/oil 612 (which is possible for some oils or gels), the end faces 614a, 614b in such applications would preferably be coated to produce higher reflectivity, as desired.

Figure 13:
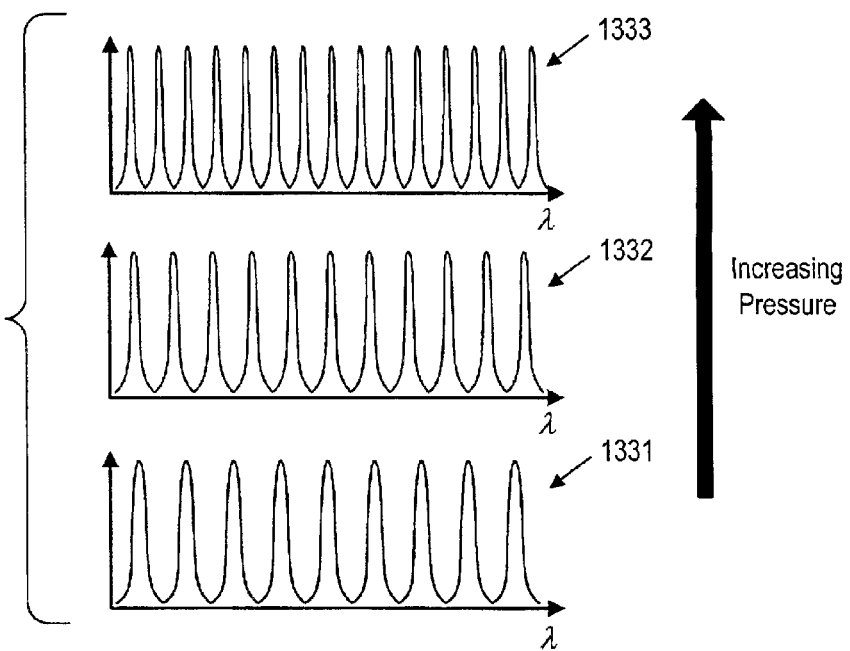
FIG. 13 includes three graphs showing, for an FP element in which a gel/oil fills the air gap, how the spectral output changes with a change in pressure.

FIG. 13 includes graphs 1331 1332 1333 showing the change with increasing pressure in the spectral output of an FP element according to the embodiment shown in FIG. 12. In operation, the signal processing would involve the use of a broad source (not shown) of input light. The return signal under these circumstances would be a "channeled" spectrum, i.e. a wavelength modulated spectral reflection of the form shown in any of the graphs of the Figure. As shown in the Figure, as the index of refraction of the pressure-responsive gel/oil increases, which occurs when the pressure increases, the "frequency" of the spectral modulation (i.e., the number of "fringes" over a given spectral range) increases. The spectral characteristics of the output uniquely define the optical path length of the cavity of the FP element 600 (FIG. 11 or 12), and thus through a calibration procedure, the pressure seen by the gel/oil can be correlated to the spectral characteristics of the output optical signal.

Figure 14:
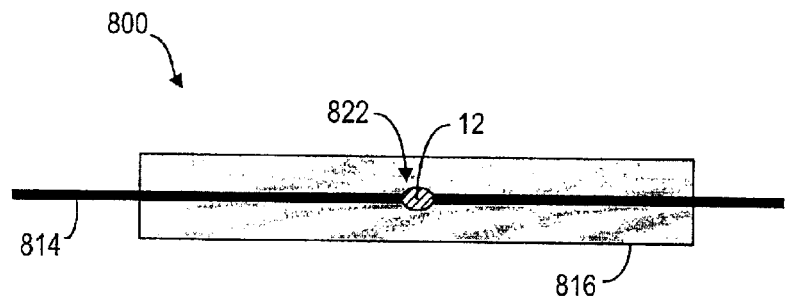
FIG. 14 is a schematic of an FP element in which the air gap is provided as a hole through the core material, a hole which is then filled with a pressure responsive gel/oil.

FIG. 14 shows another embodiment of an FP element generally indicated as 800, in which an optical fiber 814 is held by a glass tube 816 consistent with the above descriptions, and in which an air gap 822 is provided in the form of a hole 822 drilled through the optical fiber 814 and the glass tube 816. The hole is, optionally, filled with a pressure-responsive gel 12. In operation, as pressure changes, the index of the gel 12 changes, thereby causing a phase shift in the resonant wavelength corresponding to the change in pressure.

Figure 15:
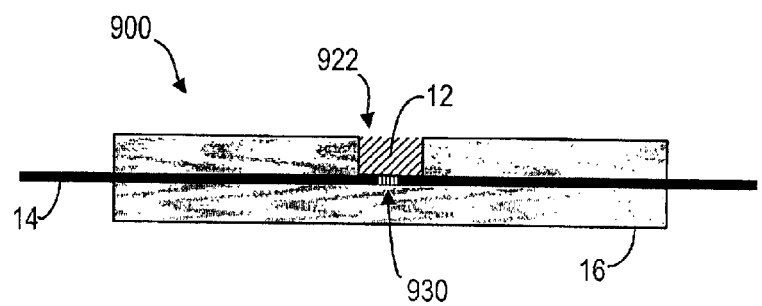
FIG. 15 is a schematic of an FP element with an air gap serving as all or part of the cavity, and having a pressure responsive gel/oil in the air gap, where the air gap is provided as a parallel slit (as in FIGS. 10A and 10B), and having a grating inscribed along the bottom of the slit.

FIG. 15 shows another embodiment of an FP element, generally indicated as 900 and based on the embodiment shown in FIG. 11, in which an air gap 922 is in the form of a shallow slot 922 in the glass tube 16, but not through the optical fiber 14. The optical fiber 14 has a fiber Bragg grating 930 arranged in the shallow slot (air gap) 922, i.e. a Bragg grating is inscribed along the length of the FP element on the surface of the bottom of the shallow slot (air gap) 922, and the shallow slot is then filled with pressure responsive gel/oil, as in the embodiment of FIG. 13. In the embodiment of FIG. 15, a Bragg wavelength shift occurs as a result of evanescent coupling. A person skilled in the art would appreciate how to interrogate the fiber Bragg grating 930 using a light source and signal processing equipment known in the art. The evanescent coupling would also work with an FP cavity where the cavity is delimited by a fiber Bragg grating, i.e. the external index, represented by 12, can alter the effective cavity length through evanescent coupling from the core to the cavity 12 (as in FIG. 14, with the slot cut only down the edge of the core). Thus, there is a coupling of light in the cavity with the grating on the cavity floor, and that coupling alters the output of the FP element in a predictable way.

Figure 16:
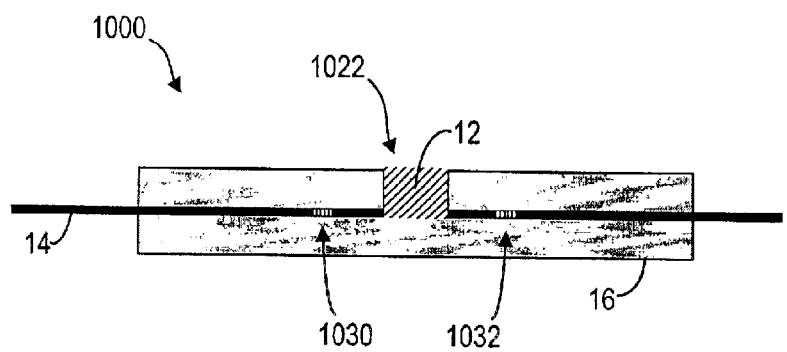
FIG. 16 is a schematic of an FP element with an air gap serving as only part of the cavity, and having a pressure responsive gel/oil in the air gap, and having gratings inscribed on either side of the air gap, set back from the air gap, so that the gratings define the cavity boundary.

FIG. 16 shows another embodiment of an FP element, generally indicated as 1000 and based on the embodiment shown in FIG. 11, which has also has a slot (air gap) 1022 filled with a pressure-responsive gel/oil 12. As shown, the optical fiber 14 has two fiber Bragg gratings 1030, 1032 arranged on each side of the slot 1022, set back into the optical fiber 18 on either side of the slot 1022, to provide the reflectivity of the cavity of the FP element and so define the boundaries of the cavity. Thus, in such an embodiment, the slot (air gap) 1022 forms only part of the cavity of the FP element, and an index matching of the gel/oil to the glass tube 16 is beneficial in suppressing reflection from the walls of the slot 1022, allowing the reflectivity of the two fiber Bragg gratings 1030, 1032 to dominate. A person skilled in the art would appreciate how to interrogate the two fiber Bragg gratings 1030, 1032 using a light source and signal processing equipment known in the art.

Figure 17:
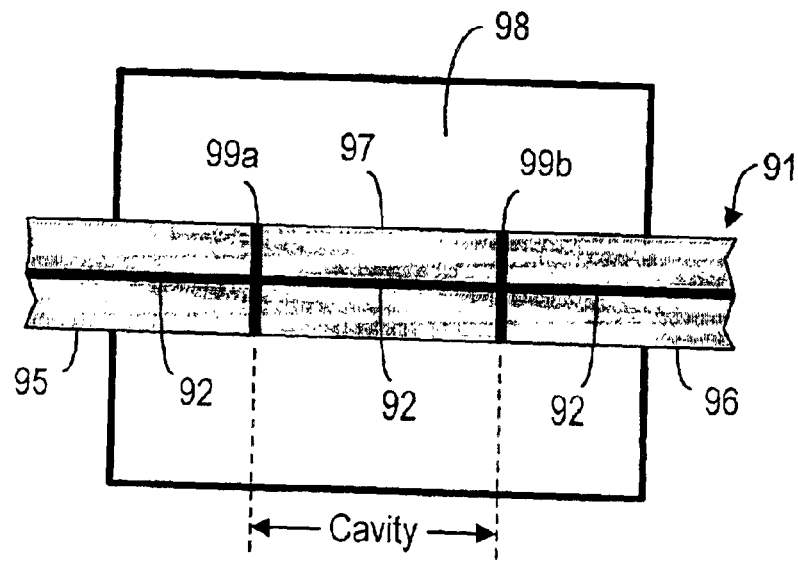
FIG. 17 is a side view of a first additional alternative embodiment of an FP element according to the invention.

Referring now to FIG. 17, in another embodiment of the invention, a standard optical fiber 91 having a core 92 is cleaved at two locations to provide a pair of outer sections of fiber 95, 96 and an intermediate section of fiber 97. The length of the intermediate section corresponds to the desired cavity length of the FP cavity. A partially reflective material is sputtered (or otherwise coated) on the ends of the intermediate section of fiber 97 (at the locations where the fiber was cleaved) to form the FP cavity, i.e. so that the FP cavity is bounded by two layers 99a, 99b of partially reflective material (at the locations where the fiber was cleaved) at either end of the intermediate section. The three sections of the optical fiber are inserted within a tube 98 formed of silica or another suitable dielectric (i.e. property transparent and with a suitable index of refraction), with the two outer sections abutting the intermediate section. The silica tube is then collapsed and fused onto the three sections of the optical fiber. Instead of coating the ends of the intermediate section of the optical fiber with partially reflective material, the ends of the pair of outer sections of the fiber, which abut the intermediate section, may be coated with the partially reflective material.

Figure 18:
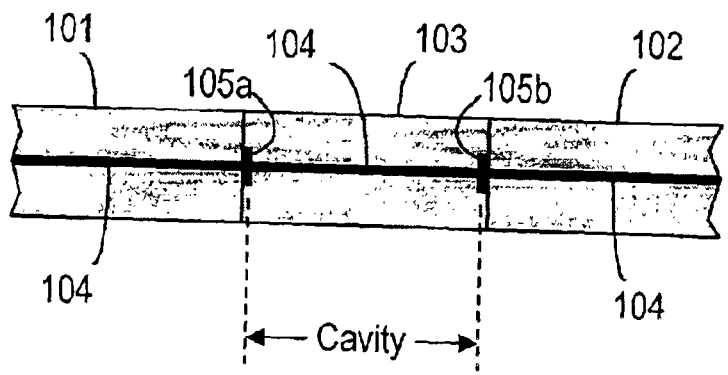
FIG. 18 is a side view of a second additional alternative embodiment of an FP element according to the invention.

Referring now to FIG. 18, in another embodiment of the invention, an FP element is formed of three large-diameter waveguides or cane waveguides: a pair of outer waveguides 101 102 and an intermediate waveguide 103, each having a core 104. The length of the intermediate waveguide corresponds to the desired cavity length of the FP cavity. An axial portion of each end of the intermediate waveguide is countersunk by machining or grinding to a pre-determined depth, and a partially reflective material is sputtered on the countersunk surfaces to form an FP cavity, bounded by two layers 105a 105b of partially reflective material at either end of the intermediate section. Ideally, the thickness of the partial reflective material is made substantially equal to the depth of the counter bore so that the reflective material is coplanar with the end surfaces of the intermediate waveguide. The outer waveguides are then fusion spliced to the ends of the intermediate waveguide. The countersinking of the reflective material leaves some glass on the outer radial portions at the ends of the intermediate waveguide, and so provides opposing flat glass surfaces to enable fusion splicing of the outer waveguides to the intermediate waveguide without adversely affecting the reflective material. While the ends of the intermediate waveguide are countersunk and coated with partial reflective material, one skilled in the art will recognize and appreciate that the ends of the pair of outer waveguides, which abut the intermediate waveguide, may instead be countersunk and coated with the partial reflective material.

Figure 19A:
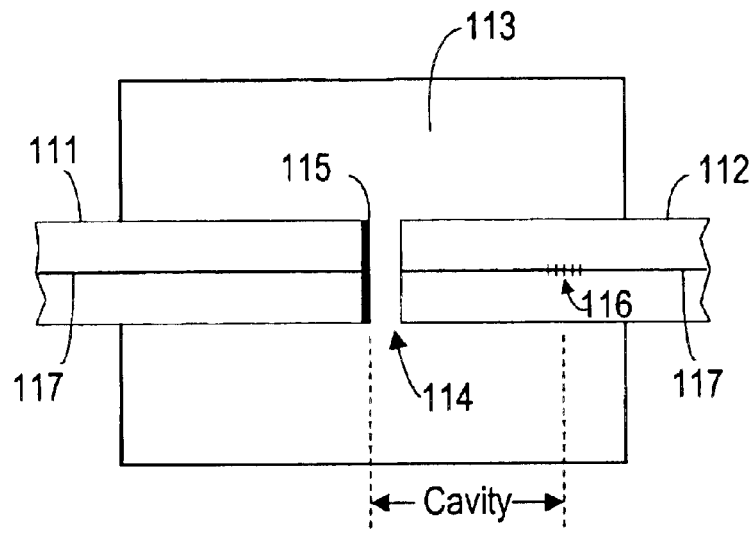
FIGS. 19A and 19B are side view of a third additional alternative embodiment of an FP element according to the invention.
Figure 19B:
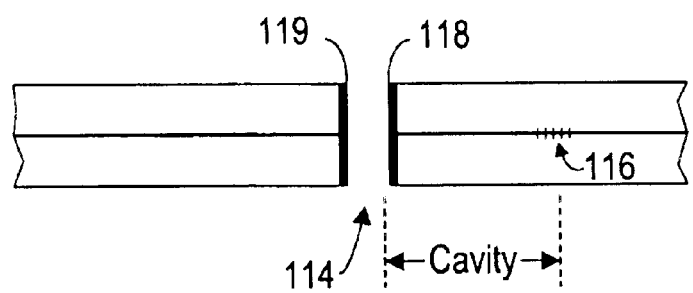

Referring now to FIG. 19A, in another embodiment of the invention, an FP element is formed of an input optical fiber 111 and an output optical fiber 112, onto which a silica tube 113 is collapsed and fused with an air gap 114 separating the input optical fiber from the output optical fiber. Each of the optical fibers 111 112 has a core 117. The axial end of the input fiber is coated with an at least partially reflective coating 115 to form one of the reflective surfaces of the FP element. The other reflective surface of the FP cavity is provided by a Bragg grating 116 inscribed in the output optical fiber at a desired distance from the reflective end surface of the input optical fiber. The distance between the reflective coating 115 and the Bragg grating 116 is the cavity length of the FP element. The air gap 114 is preferably a small air gap, and the Bragg grating is a high reflectivity grating.

Alternatively, referring now to FIG. 19B, instead of a partial reflective coating at the end of the input fiber at the air gap 114, the end of the output fiber at the air gap (the fiber having the grating) may be coated with a partial reflective coating 118, and the end of the input fiber at the air gap may be coated with an anti-reflective coating 119. In such an arrangement, the air gap is outside of the FP cavity.

Figure 20A:
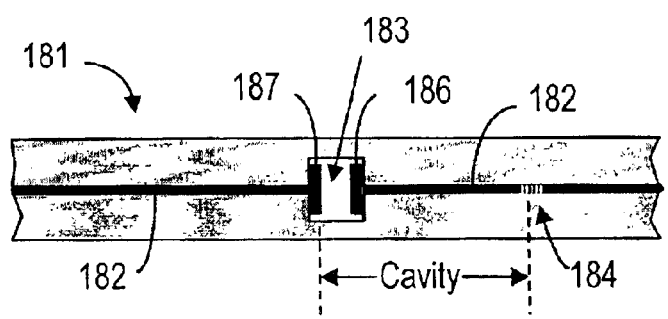
FIGS. 20A and 20B are side views of a fourth additional alternative embodiment of an FP element according to the invention.

Referring now to FIG. 20A, in another embodiment of the invention, an FP element is formed of a large-diameter waveguide or cane waveguide 181 with a portion of the core 182 removed, leaving behind an air gap 183 serving as one reflective surface of the element, and a Bragg grating 184 written into the core to provide the other reflective surface. The spacing between the air gap and the Bragg grating corresponds to the desired cavity length of the FP cavity. The air gap is preferably formed by machining, cutting, drilling or grinding a slip partially through the cane sufficient to create the air gap within the core, but leaving a portion of the cladding intact. The surface of the waveguide exposed to the air gap adjacent to the grating may be coated with an anti-reflective coating 186, and the other surface may be coated with a partial reflective coating 187.

Figure 20B:
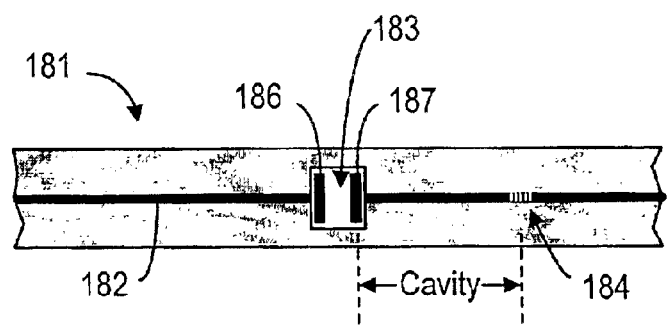

Alternatively, referring now to FIG. 20B, the surface of the waveguide exposed to the air gap adjacent to the grating may be coated with a reflective coating 187, and the other surface of the air gap may be coated with an anti-reflective coating 186. In such an arrangement, the air gap is outside of the FP cavity.

Figure 21A:
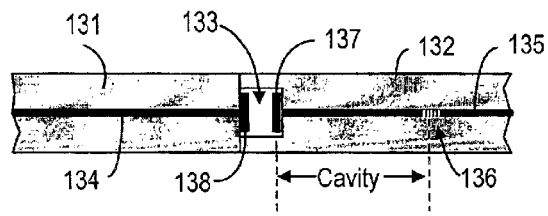
FIGS. 21A, 21B, and 21C are side views of a fifth additional alternative embodiment of an FP element according to the invention.

Referring now to FIG. 21A, in another embodiment of the invention, an FP element is formed of a pair of large-diameter waveguides or cane waveguides, an input waveguide 131 and an output waveguide 132, fusion spliced together. The FP element includes an air gap 133 separating the two cores 134 135; it is formed by machining or grinding to a predetermined depth along the core of the output waveguide. A partially reflective material is sputtered/coated on the surface of the axial portion of the output waveguide, forming a reflective coating 137 that serves as one reflective surface of the FP cavity. The output waveguide includes a Bragg grating 136 written into the core to provide the second reflective surface of the FP element. The spacing between the reflective coating 137 and the Bragg grating 136 corresponds to the desired cavity length of the FP cavity.

The partial reflective coating 137 (which can be closer in thickness to the depth of the air gap than is shown in FIG. 21A) must be thin enough that when the cane waveguides 131 132 are compressed to tune the Bragg grating, the partial reflective coating does not also compress, since it might be distorted under compression and not reflect axially.

In addition to providing the reflective coating 137 on the output waveguide 132, an anti-reflective coating 138 is preferably provided on the end of the input waveguide 131 at the air gap 133.

As would be clear to one of skill in the art, the reflective coating 137 and the anti-reflective coating 138 of FIG. 21A may be switched, in which case the cavity would include the air gap 133, where in FIG. 21A, the air gap 133 is shown as outside of the cavity of the FP element.

Figure 21B:
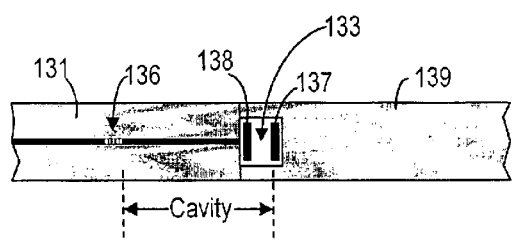

Referring now to FIG. 21B, in another embodiment of the invention, an FP element is substantially the same as that shown in FIG. 21A, except that the Bragg grating 136 is written in the core of the input waveguide 131 and the output cane waveguide 132 of FIG. 21A is replaced by a non-waveguide element 139, such as a glass rod or other material that would serve to transmit a compressive force to the input waveguide 131 when combined with the system shown in FIG. 1. In the embodiment shown in FIG. 21B, light enters waveguide 131, reflects off the coating 137 (on the distal wall of the air gap), and enters a resonant condition established by the grating 136 and the reflective coating 137. (The coating 138 is a non-reflective coating.) Light at the resonant wavelength is transmitted out of the device through waveguide 131 into a transmission fiber (not shown).

Figure 21C:
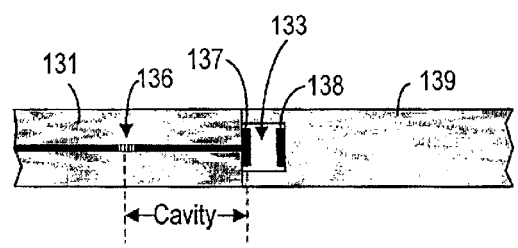

Referring now to FIG. 21C, in another embodiment of the invention, a Fabry-Perot is substantially the same as that shown in FIG. 21B, except that the coating 188 is made reflective. In the embodiment shown in FIG. 21C, light enters waveguide 131, reflects off surface 137 (now on the proximal wall of the air gap), and enters a resonant condition established by the grating 136 and the reflective surface 137. Light at the resonant wavelength is transmitted out of the device through waveguide 131 into a transmission fiber (not shown).

Figure 22A:
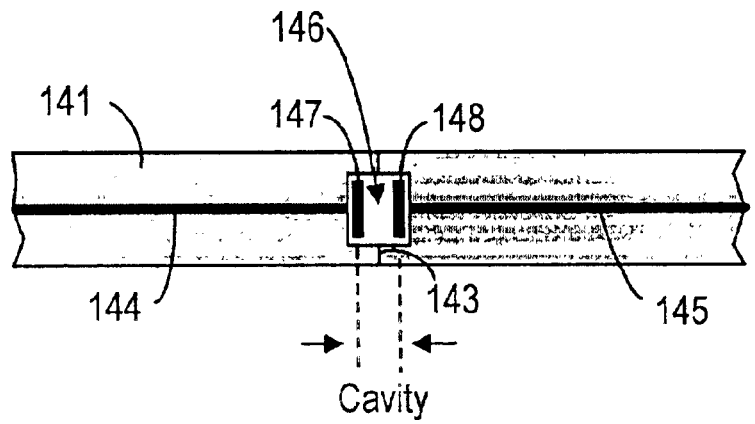
FIGS. 22A and 22B are side views of a sixth additional alternative embodiment of an FP element according to the invention.

Referring now to FIG. 22A, in another embodiment of the invention, an FP element is formed of an input waveguide 141 and an output waveguide 142, both of which are large-diameter waveguides or cane waveguides and that are fusion spliced together 143, but only outside of the cores 144 145 of the two waveguides, which are themselves separated by an air gap 146. Coatings 147 148 that are at least partially reflective are applied to the ends of each waveguide at the air gap, i.e. at the ends of the cores 144 145 terminating at the air gap 146. The coatings 147 148 provide the two reflective surfaces of the FP cavity. The spacing between the at least partially reflective coatings 147 148 at either end of the air gap 146 corresponds to the desired cavity length of the FP cavity.

To provide the air gap, an axial portion of one end of both the input and output waveguides 141 142 is countersunk by machining or grinding counter bores to a pre-determined depth. The thickness of the partial reflective coatings 147 148 must be less than the depth of the counter bores so that compression of the cane waveguides to change the spacing of the air gap does not compress and distort the reflective coatings.

Figure 22B:
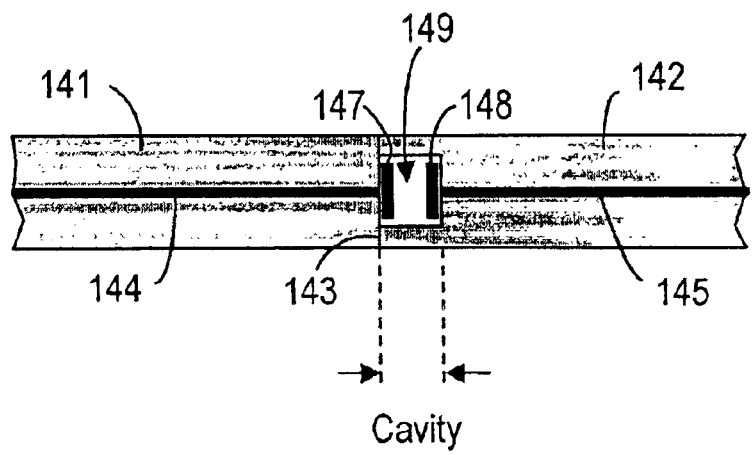

Referring now to FIG. 22B, in a variation of the embodiment of FIG. 22A, the end surface of only one of the waveguides, such as the output waveguide 142, is provided with a counter bore portion to provide an air gap 149, and at least partially reflective coatings 147 148 are provided on the cores 144 145 of the optical waveguides 141 142 at the air gap 149 so provided.

All of the above embodiments may be used in a sensing device for sensing pressure, force, temperature or strain.

Scope of the Invention

Although the invention has been described and illustrated with respect to exemplary embodiments thereof, the foregoing and various other additions and omissions may be made therein and thereto without departing from the spirit and scope of the present invention.

We claim:

1. An optical sensing device, comprising:
a force-applying assembly for providing a force; and
a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an output optical signal containing information about a parameter that relates to the force, wherein the large-diameter waveguide structure has Bragg gratings.

2. An optical sensing device, comprising:
a force-applying assembly for providing a force; end
a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an output optical signal containing information about a pressure that relates to the force, wherein the optical sensing device includes as part or all of the cavity an air gap and further wherein the optical sensing device comprises a material arranged in the air gap that has an index of refraction that changes depending on the pressure.

3. An optical sensing device comprising:
a force-applying assembly for providing a force; and
a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an output optical signal containing information about a parameter that relates to the force, wherein the large-diameter waveguide has a slot therein that forms the cavity, and wherein the slot has a Bragg grating formed therein along the length of the large-diameter waveguide.

4. An optical sensing device comprising:
a force-applying assembly for providing a force; and
a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an output optical signal containing information about a parameter that relates to the force, wherein the large-diameter waveguide has a slot therein that forms the cavity, and wherein the large-diameter waveguide includes a pair of fiber Bragg gratings arranged on opposite sides of the slot so as to provide the reflective surfaces of the cavity.

5. An optical sensing device, comprising:
a force-applying assembly for providing a force; and
a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an output optical signal containing information about a parameter that relates to the force, wherein the optical sensing device includes as part or all of the cavity an air gap and further wherein the optical sensing device comprises a material arranged in the air gap that has an optical characteristic that changes depending on the parameter, wherein the force-applying assembly comprises a pressure housing having the material therein, the pressure housing including a pressure port for responding to pressure.

6. A multiplexed FP sensor system having a plurality of FP sensors, each FP sensor having a cavity and comprising:
  a large-diameter waveguide having end faces separated by a predetermined but variable distance, the end faces delimiting all or part of the cavity of the FP sensor, wherein each FP sensor produces fringes with different frequencies in an optical frequency domain;
  wherein the cavity is responsive to an optical signal, and further responsive to a force applied to the large-diameter waveguide that causes a change in the optical path length of the cavity, for providing an output optical signal containing information about a parameter that relates to the force applied to the large-diameter waveguide.

7. A multiplexed Fabry-Perot (FP) sensor system comprising:
  a plurality of FP sensors, each FP sensor having a cavity and comprising:
    a large-diameter waveguide having end faces separated by a predetermined but variable distance, the end faces delimiting all or part of the cavity of the FP sensor, wherein a cladding around a core of the large-diameter waveaulde has an outer diameter of at least 0.3 millimeters;
    wherein the cavity is responsive to an optical signal, and further responsive to a force applied to the large-diameter waveguide that causes a change in the optical path length of the cavity, for providing an output optical signal containing information about a parameter that relates to the force applied to the large-diameter waveguide
  a broadband source, and coupled in series, a wavemeter/spectrometer, a Fourier transform module, a frequency band filter, and an inverse Fourier transform module;
  wherein the broadband source provides a broadband optical signal;
  wherein each FP sensor responds to the broadband optical signal and the combination of FP sensors provides a composite output optical signal that is a combination of the output optical signals provided by each sensor;
  wherein the wavemeter/spectrometer responds to the composite output optical signal and provides a wavemeter/spectrometer signal containing information about the spectrum of the composite output optical signal;
  wherein the Fourier transform module responds to the wavemeter/spectrometer signal and provides a Fourier transform signal containing information about the Fourier transform of the wavemeter/spectrometer signal;
  wherein the frequency band filter responds to the Fourier transform signal and provides a frequency band filter signal containing information about a portion of the Fourier transform signal; and
  wherein the inverse Fourier transform responds to the frequency band filter signal and provides an inverse Fourier transform signal containing information about the respective different output optical signals provided by each FP sensor.

8. An optical sensing device comprising:
a force-applying assembly for providing a force; and
a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an output optical signal containing information about a parameter that relates to the force, wherein the FP element comprises two outer sections of optical fiber and an intermediate section of optical fiber arranged end to end, and an at least partially reflective coating is provided at the juncture between each outer section and the intermediate section, and further comprising a dielectric tube collapsed onto the intermediate section of optical fiber and at least a portion of each of the outer sections of optical fiber.

9. An optical sensing device comprising:
a force-applying assembly for providing a force; and
a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an output optical signal containing information about a parameter that relates to the force, wherein the FP element comprises two outer sections of large-diameter optical waveguides and an intermediate section of large-diameter optical waveguide arranged end to end, and an at least partially reflective coating is provided at the juncture between each outer section and the intermediate section.

10. An optical sensing device comprising:
a force-applying assembly for providing a force; and
a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an output optical signal containing information about a parameter that relates to the force, wherein the FP element comprises an input optical fiber and an output optical fiber arranged end to end with an air gap between them and onto which a dielectric tube is collapsed and fused, wherein the output optical fiber has a Bragg grating, and further comprising an at least partially reflective coating provided within the air gap, on either of the ends of the two optical fibers terminating at the air gap.

11. An optical sensing device comprising:
a force-applying assembly for providing a force; and
a Fabry-Perot (FP) element including a large-diameter waveguide having a core and having a cavity in line with the core, the cavity having reflective surface and having an optical path length related to the distance between the reflective surfaces, the FP element being coupled to the force so that the optical path length changes according to the force, the FP element for providing an output optical signal containing information about a parameter that relates to the force, wherein the FP element comprises a large-diameter optical waveguide having a core, from which a section of the core has been removed to provide an air gap, leaving behind at least some of the adjacent cladding, and including a Bragg grating on one side of the air gap, and further comprising an at least partially reflective coating provided within the air gap, on either of the ends of the core of the large-diameter optical waveguide terminating at the air gap.

12. An optical sensing device comprising:

a force-applying assembly for providing a force; and a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an output optical signal containing information about a parameter that relates to the force, wherein the FP element comprises two large-diameter optical waveguides fusion-spliced together end-to-end, each having a core, wherein a section of the core has been removed from one of the large-diameter optical waveguides to provide an air gap, the removing being performed so as to leave behind at least some of the adjacent cladding, and wherein a Bragg grating is provided in the core of one of the large-diameter optical waveguides, and further comprising an at least partially reflective coating provided within the air gap, on either of the ends of the cores of the large-diameter optical waveguides terminating at the air gap.

13. An optical sensing device comprising:

a force-applying assembly for providing a force; and a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an output optical signal containing information about a parameter that relates to the force, wherein the FP element comprises a pair of large-diameter optical waveguides fusion-spliced together end-to-end with a non-waveguide element, the large-diameter optical waveguides having a core, wherein a section of the non-waveguide element has been removed so as to provide an air gap, and wherein a Bragg grating is provided in the core of the large-diameter optical waveguide, and further comprising a partially reflective coating provided within the air gap on the end of the core of the large-diameter optical waveguide terminating at the air gap, and a reflective coating on the end of the non-waveguide element terminating at the air gap.

14. An optical sensing device comprising:

a force-applying assembly for providing a force; and a Fabry-Perot (FP) element including a large-diameter waveguide having a core and having a cavity in line with the core, the cavity having reflective surfaces and having an optical path length related to the distance between the reflective surfaces, the FP element being coupled to the force so that the optical path length changes according to the force, the FP element for providing an output optical signal containing information about a parameter that relates to the force, wherein the FP element comprises two large-diameter optical waveguides fusion-spliced together end-to-end, each having a core, wherein a section of the core has been removed from at least one of the large-diameter optical waveguides to provide an air gap, the removing being performed so as to leave behind at least some of the adjacent cladding, and further comprising an at least partially reflective coating on each of the ends of the cores of the large-diameter optical waveguides terminating at the air gap.

* * * * *